(12) United States Patent
Cuddy et al.

(10) Patent No.: US 10,029,835 B1
(45) Date of Patent: Jul. 24, 2018

(54) TOOL-FREE CABLE MOUNTING DEVICE

(71) Applicant: The Boeing Company, Chicago, IL (US)

(72) Inventors: Nathanial Cuddy, Snohomish, WA (US); Anthony E. Anderson, Snohomish, WA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 15/581,318

(22) Filed: Apr. 28, 2017

(51) Int. Cl.
| | |
|---|---|
| *F16L 3/22* | (2006.01) |
| *B65D 63/10* | (2006.01) |
| *F16L 3/127* | (2006.01) |
| *F16L 3/233* | (2006.01) |
| *F16L 3/137* | (2006.01) |

(52) U.S. Cl.
CPC .......... *B65D 63/1027* (2013.01); *F16L 3/127* (2013.01); *F16L 3/137* (2013.01); *F16L 3/222* (2013.01); *F16L 3/233* (2013.01); *B65D 2563/107* (2013.01); *B65D 2563/108* (2013.01)

(58) Field of Classification Search
USPC ...................................... 248/68.1
See application file for complete search history.

(56) References Cited

U.S. PATENT DOCUMENTS

| | | | | | |
|---|---|---|---|---|---|
| 3,463,427 | A | * | 8/1969 | Fisher | F16L 3/2332 24/16 PB |
| 3,552,696 | A | * | 1/1971 | Orenick | F16L 3/1236 248/71 |
| 3,756,115 | A | * | 9/1973 | Schuplin | F16B 21/086 411/508 |
| 4,735,387 | A | * | 4/1988 | Hirano | F16L 3/233 24/16 PB |
| 5,803,413 | A | * | 9/1998 | Benoit | B65D 63/1072 24/16 PB |
| 5,820,083 | A | * | 10/1998 | Geiger | F16L 3/123 248/68.1 |
| 5,921,510 | A | * | 7/1999 | Benoit | F16L 3/2334 248/68.1 |
| 6,253,421 | B1 | * | 7/2001 | Kraus | B65D 63/1063 24/16 PB |
| 6,592,083 | B1 | * | 7/2003 | Hobson | F16L 3/1233 248/68.1 |
| 7,681,844 | B2 | * | 3/2010 | Rosemann | F16L 3/2332 24/16 PB |
| 7,686,259 | B2 | * | 3/2010 | Caveney | B60R 16/0215 211/85.5 |
| 7,740,210 | B2 | * | 6/2010 | Pilon | B65D 63/1081 24/16 PB |
| 7,753,321 | B2 | * | 7/2010 | Geiger | B60R 16/0215 248/68.1 |

(Continued)

*Primary Examiner* — Monica E Millner
(74) *Attorney, Agent, or Firm* — Duft Bornsen & Fettig LLP (57) ABSTRACT

A cable mounting device for securing a cable. The cable mounting device includes a spacer having an elongated body with a base end and a top end distal from the base end. The cable mounting device further includes a cable fastener integrally formed with the spacer on a side of the elongated body approximate to the top end. The cable fastener includes a locking head and a strap that engage to form a closed loop that is non-overlapping with an area directly above the top end of the spacer.

20 Claims, 6 Drawing Sheets

(56) References Cited

U.S. PATENT DOCUMENTS

| | | | | |
|---|---|---|---|---|
| 7,770,852 B2* | 8/2010 | Caveney | ............... | F16B 5/0685 |
| | | | | 248/68.1 |
| 7,997,542 B2* | 8/2011 | Morello | .................... | F16L 3/13 |
| | | | | 24/16 PB |
| 8,888,053 B2* | 11/2014 | Blanchard | ............... | B64C 1/406 |
| | | | | 248/68.1 |
| 9,309,033 B2* | 4/2016 | Dorsey | .................. | B65D 63/00 |
| 9,377,135 B2* | 6/2016 | Karls | ...................... | F16L 3/222 |
| 9,828,151 B2* | 11/2017 | Aoyama | ............ | B65D 63/1027 |
| 2004/0076465 A1 | 4/2004 | Geiger | | |
| 2005/0121560 A1* | 6/2005 | Slyter | .................. | F16B 5/0685 |
| | | | | 248/71 |
| 2008/0056841 A1 | 3/2008 | Hitchcock | | |
| 2013/0119208 A1* | 5/2013 | Geiger | .................... | F16L 3/233 |
| | | | | 248/68.1 |

\* cited by examiner

TOOL-FREE CABLE MOUNTING DEVICE

FIELD

This disclosure relates to cable tie devices, and more particularly, to cable ties that secure cables to a structure, such as a wall of an aircraft.

BACKGROUND

A large aircraft may have in excess of thirty thousand clamps installed into its inner walls to support cables that provide power, communication, and oxygen throughout the aircraft. Each clamp is installed manually by an aircraft mechanic. Installation of a typical clamp, such as a p-clamp, involves inserting a screw through the clamp to form a closed loop that bundles the cable, and fastening the screw with a screwdriver into an insert in the wall of the aircraft. Each clamp installation may require or involve additional separate parts (e.g., spacers, washers, plastic cable ties, etc.) to properly secure aircraft cables so that the cables are manageable and adhere to aircraft manufacturing requirements. For example, aircraft electrical standards often require oxygen cables to be spaced a minimum distance from certain types of electrical wires throughout the aircraft. The aircraft mechanics therefore have the cumbersome task of manually assembling many spacer/clamp combinations to ensure the cables are secured at particular distances from one another throughout the aircraft.

The aircraft mechanic is also tasked with ensuring each clamp supports its cable to the wall of the aircraft according to vibration and load requirements for flight. To that end, the mechanic may use additional hand tools such as a glue gun to strengthen the bond between a wall insert and a metal screw. However, strongly secured clamps may be irremovable for replacement or maintenance procedures unless the aircraft mechanic has additional hand tools to uninstall the clamps. Therefore, current solutions for securing aircraft cables are manually cumbersome and involve many hand tools and separate parts which increase the risk that foreign objects will be left behind that can cause injury or damage to the aircraft. There is thus an ongoing need for improved cable securing devices which are easily installed and removed in various spaced configurations with little or no hand tools and separate parts, and which are lightweight while still being able to mount cables securely to meet aircraft load and vibration requirements.

SUMMARY

Embodiments described herein provide a cable mounting device. The device is a unibody structure with an integrated cable tie near the top end of the device. The cable tie is configured to bundle cables above and to the side of the device. The device also includes a substrate attachment feature on the base end of the device which is mountable to any appropriately dimensioned hole. Thus, inserts and other fastener-type parts are not needed to install the device into a substrate with standard holes. The body of the device includes an opening that exposes an integrated rivet that is accessible to a human hand or finger through the side of the body. The rivet is slidable within the body to cause expansion/retraction at the mounted base end which enables tool-free installation/removal of the one-piece device from the substrate. Since the integrated cable tie near the top end of the device bundles cables above and to the side of the device, another similar cable mounting device may be stacked on the top end of the device and firmly secured into a top opening in the top end in a similar manner to a substrate hole. Furthermore, the side access of the rivet allows a user to remove, adjust, and/or re-mount the device to the hole while it is in a stacked configuration. The cable mounting device therefore enables cables to be secured firmly, quickly, and in many different spaced configurations with no extraneous tools or parts to be left behind on the job site.

One embodiment is an apparatus that includes a cable tie mount. The tie mount includes a spacer having an elongated body with a base end and a top end distal from the base end. The cable tie mount further includes a cable fastener integrally formed with the spacer on a side of the elongated body approximate to the top end. The cable fastener includes a locking head and a strap that engage to form a closed loop that is non-overlapping with an area directly above the top end of the spacer.

In a further embodiment, the cable tie mount further includes a rivet integrated with the spacer. The spacer has a notch that exposes the rivet in the elongated body of the spacer. In still a further embodiment, the rivet includes a head, a shank extending from the head, and an expandable plug formed on the base end of the elongated body outside the spacer. The expandable plug is aligned with a base opening in the base end and includes a plurality of legs with a slit centered about the legs. The legs are configured to expand radially away from one another when the shank is pressed through the base opening and into the slit via a force applied to the head of the rivet. In yet a further embodiment, a portion of the head protrudes from the notch to be exposed outside the spacer.

Another embodiment is an apparatus that includes a cable tie mount. The cable tie mount includes a spacer having an elongated body with a base end, a top end distal from the base end, a hollow cavity between the base end and the top end, and a notch in a side of the elongated body that exposes the hollow cavity of the spacer. The cable tie mount further includes a cable fastener formed on the elongated body, and a rivet including a head, a shank, and an expandable plug distal from the head. The base end includes a base opening that is smaller than the hollow cavity. The head is positioned in the hollow cavity and is larger than the base opening. The shank is sized to fit through the base opening and into the expandable plug to cause the expandable plug to expand. The expandable plug is formed on the base end to project away from the spacer, and the notch exposes the head through the side of the elongated body. In a further embodiment, the top end of the spacer includes a top opening that is sized to receive another expandable plug of another cable tie mount.

In yet another embodiment, an apparatus includes a plurality of cable tie mounts including at least a first cable tie mount and a second cable tie mount, each cable tie mount includes: a spacer having an elongated body with a base end, a top end distal from the base end, a hollow cavity between the base end and the top end, and a notch in a side of the elongated body that exposes the hollow cavity of the spacer, a cable fastener formed on the elongated body, and a rivet integrated with the spacer and including a head, a shank, and an expandable plug distal from the head. The top end includes a top opening that is smaller than the hollow cavity. The base end includes a base opening that is smaller than the hollow cavity. The head is positioned in the hollow cavity of the spacer and is larger than the base opening. The shank extends through the base opening and is slidable within the base opening. The expandable plug projects from the base end of the spacer. The expandable plug of the second cable tie mount fits into the top opening of the first cable tie mount to stack the second cable tie mount on top of the first cable tie.

The above summary provides a basic understanding of some aspects of the specification. This summary is not an extensive overview of the specification. It is intended to neither identify key or critical elements of the specification nor delineate any scope of the particular embodiments of the specification, or any scope of the claims. Its sole purpose is to present some concepts of the specification in a simplified form as a prelude to the more detailed description that is presented later.

DESCRIPTION OF THE DRAWINGS

Some embodiments are now described, by way of example only, and with reference to the accompanying drawings. The same reference number represents the same element or the same type of element on all drawings.

DESCRIPTION

The figures and the following description illustrate specific exemplary embodiments. It will thus be appreciated that those skilled in the art will be able to devise various arrangements that, although not explicitly described or shown herein, embody the principles of the embodiments and are included within the scope of the embodiments. Furthermore, any examples described herein are intended to aid in understanding the principles of the embodiments, and are to be construed as being without limitation to such specifically recited examples and conditions. As a result, the inventive concept(s) is not limited to the specific embodiments or examples described below, but by the claims and their equivalents.

Figure 1:
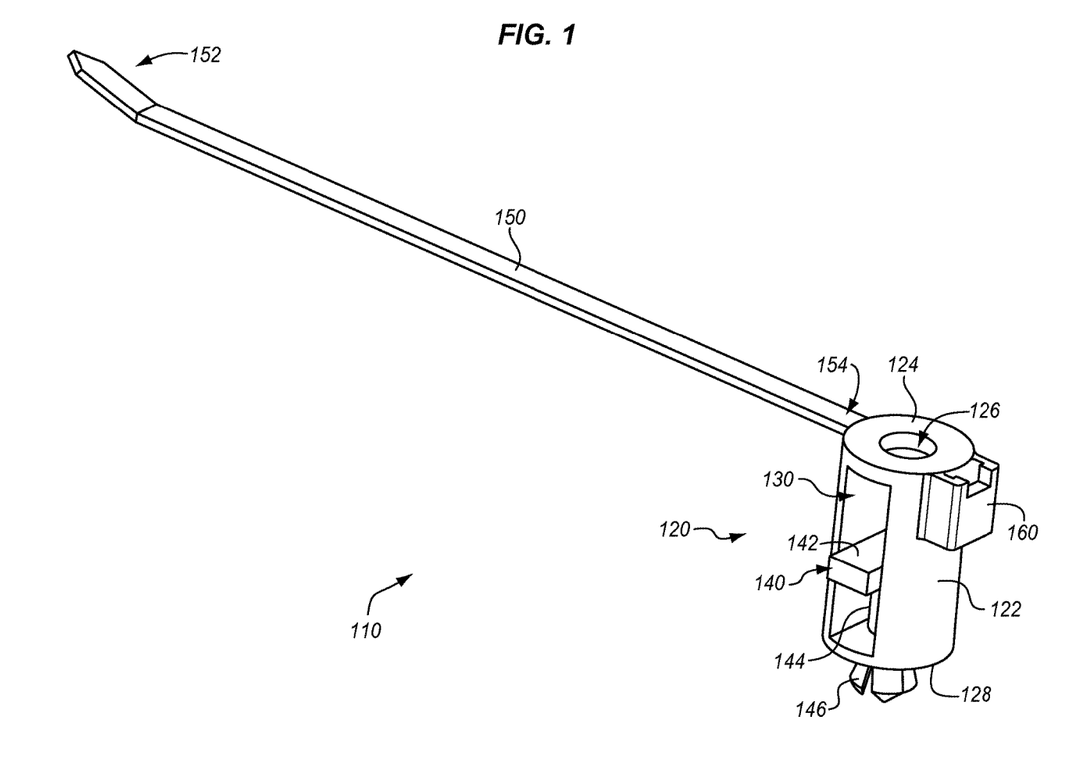
FIG. 1 is a perspective view of a cable tie mount in an exemplary embodiment.

FIG. 1 is a perspective view of a cable tie mount 110 in an exemplary embodiment. Cable tie mount 110 is useful for securing cables of an aircraft (e.g., electrical wiring, oxygen tubes, etc.) to a wall of an aircraft, though alternative applications and uses for cable tie mount 110 will be recognized. The cable tie mount 110 includes a spacer 120, a strap 150, and a locking head 160. In general, the strap 150 is insertable through the locking head 160 to form a loop around cables to be secured.

The spacer 120 enables securing cables at fixed distances and thus is generally rigid with an elongated body 122, a top end 124, and a base end 128. The strap 150 is a flexible member with a free end 152 and an attached end 154. The locking head 160 is capable of receiving the free end 152 of the strap 150, thereby forming a fastening device that may be cinched around one or more cables. The spacer 120, the strap 150, and the locking head 160 may be integrally formed together as a unitary structure.

The cable tie mount 110 may be further enhanced to accommodate tool-free installation. To that end, the cable tie mount 110 may include a rivet 140 integrated with the spacer 120 which is slidable within the elongated body 122. The rivet 140 includes a head 142, a shank 144, and an expandable plug 146. A notch 130 in a side of the elongated body 122 of the spacer 120 exposes a hollow cavity of the spacer 120 in which the rivet 140 resides, thereby enabling the head 142 of the rivet 140 to be accessed by a human hand or finger. In one embodiment, the head 142 of the rivet 140 extends outwardly from notch 130 such that a portion of the head 142 protrudes beyond the outer surface of the elongated body 122 as shown in FIG. 1. Such a configuration may advantageously improve a user's ability to exert downward and upward forces to the head 142 to drive and retract the rivet 140, particularly in instances in which the spacer 120 and/or the notch 130 are of smaller sizes which make hand accessibility into the side of the elongated body 122 more difficult.

When the head 142 of the rivet 140 is pressed in a downward direction toward the base end 128, the shank 144 slides through a base opening (not shown in FIG. 1) in the base end 128 of the spacer 120. As the rivet 140 is further pressed, the shank 144 penetrates the expandable plug 146 that is formed on the outer surface of the base end 128 and causes the expandable plug 146 to expand, thereby securing the cable tie mount 110 to a structure. The cable tie mount 110 may also include a top opening 126 in the top end 124 of the spacer 120. The top opening 126 enables stacking additional cable tie mounts as described in greater detail below.

In one embodiment, the components of the cable tie mount 110 including the spacer 120, the strap 150, the locking head 160, and the rivet 140 are integrally formed into a unitary structure. The components may be molded (e.g., via investment casting, injection molding, 3-D printing, etc.) into a single piece of continuous material such as nylon, polycarbonate, or another suitable plastic material. As such, the integrally formed piece may include one or more molded connection points that join/position the rivet 140 inside the spacer 120. The molded connection points may be strong enough such that an accidental separation of the rivet 140 from the spacer 120 is unlikely but weak enough such that the connections are relatively easily broken when an appropriate downward force is applied to the rivet 140 for installing the cable tie mount 110 to a substrate. Alternatively or additionally, the rivet 140 may be rendered inseparable from the spacer 120, or at least substantially inseparable such that the rivet 140 does not fall out of the notch 130 under rotation or appropriate installation forces, by sizing the notch 130, the rivet 140, and/or the base opening in the base end 128 to have appropriate relative dimensions for holding the rivet 140 in place inside the spacer 120.

It will be appreciated that the drawings and descriptions of the cable tie mount 110 are exemplary for discussion purposes, and that additional or alternative components, component combinations/configurations, and relative sizes/positions/shapes of components are possible. For instance, in one embodiment, elongated body 122 is a cylindrical body as shown in FIG. 1. Alternatively, spacer 120 may have an elongated body 122 with a non-circular side, top end 124, and/or base end 128. In another embodiment, strap 150 is an elongated flexible member that is substantially uniform with a rectangular cross-section. Alternatively or additionally, the strap 150 may taper at or near the free end 152 or be constructed in a different shape, size, or length.

Figure 2:
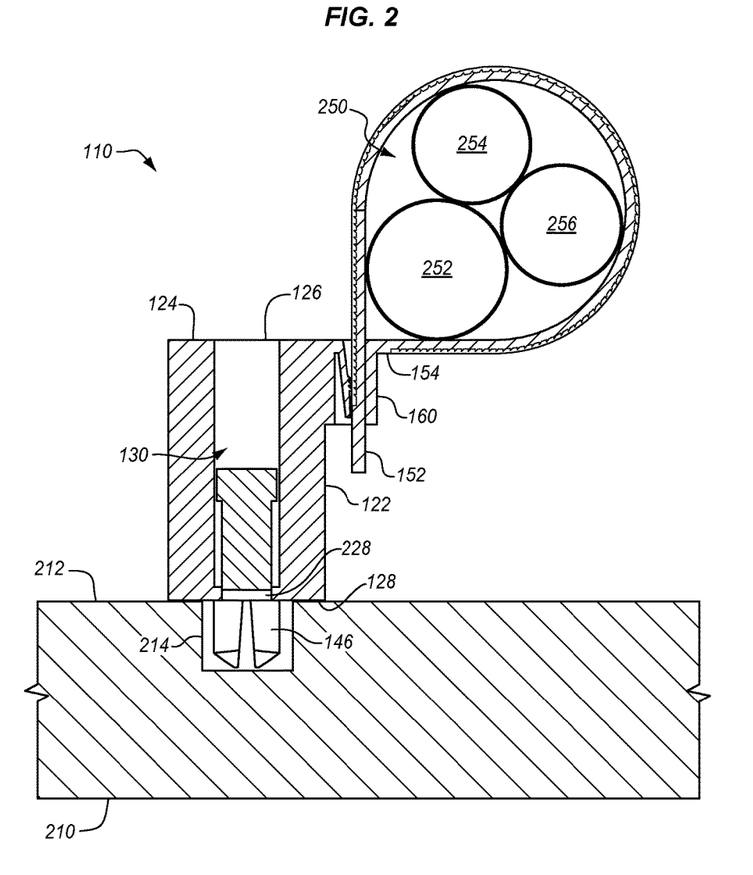
FIG. 2 is a cross-sectional view of the cable tie mount in another exemplary embodiment.

FIG. 2 is a cross-sectional view of the cable tie mount 110 in another exemplary embodiment. FIG. 2 shows the cable tie mount 110 engaged with a substrate 210 such as an inner wall of an aircraft or another type of structure. The substrate 210 is drilled or punched to create at least one hole 214 in the mounting surface 212 of the substrate 210. The expandable plug 146, which is formed on and projects from the base end 128 of the spacer 120, has a dimension slightly undersized relative to the hole 214 so that it may be fitted into the hole 214. The base end 128 has a dimension larger than the hole 214 so that its surface contacts the mounting surface 212 of the substrate 210 in a substantially flush and/or flat manner when the expandable plug 146 is fitted into the hole 214.

FIG. 2 also illustrates an embodiment of the cable tie mount 110 in which the strap 150 and the locking head 160 are formed together on the side of the elongated body 122 of the spacer 120. More particularly, the locking head 160 is formed on the side of the elongated body 122 near or adjacent to the top end 124, and the attached end 154 of the strap 150 is joined to the other side of the locking head 160 and projects away from the spacer 120 in a direction substantially perpendicular to the elongated body 122 (or parallel with a flat surface of the top end 124). The locking head 160 is configured with a channel having an entrance for the free end 152 of the strap 150 that is on or near a horizontal plane defined by the surface or surface perimeter of the top end 124, and an exit downward from the entrance in a direction substantially parallel with the elongated body 122 which allows the strap 150 to be tightened around a bundle 250 of cables 252-256. Under this configuration, the cable tie mount 110 is able to secure the bundle 250 with the strap 150 and the locking head 160 at a fixed distance above the substrate 210 and at a position that is away from (e.g., to the side of) an area directly above the top end 124 of the spacer 120. As such, the top end 124 of the spacer 120 may remain available for stacking an additional cable tie mount while the strap 150 and the locking head 160 form a closed loop around the cables 252-256. The strap 150 and the locking head 160 may form a closed loop which positions the bottom of the bundle 250 above, in line with, or near a horizontal plane defined by the surface or surface perimeter of the top end 124. The cables 252-256 may include any combination of wires, tubes, conduits or other items to be secured relative to the substrate 210.

The expandable plug 146 provides an anchor that secures the spacer 120, and therefore the cables 252-256 bundled by the strap 150 and the locking head 160, to the substrate 210. The base end 128 of the spacer 120 includes a base opening 228 sized larger than the shank 144 yet smaller than the head 142 so that the shank 144 is slidable through the base opening 228 while the head 142 is not. When a downward force is applied to the head 142, the shank 144 slides through the base opening 228 and into the expandable plug 146, causing the expandable plug 146 to expand into the interior walls of the hole 214 and firmly secure the cable tie mount 110 to the substrate 210. When the rivet 140 is in a newly formed or uncompressed state, the shank 144 may align with the base opening 228 with a tip or end portion of the shank 144 inside or near the base opening 228 a minimal distance from the expandable plug 146. The expandable plug 146 may be formed on the base end 128 and/or formed with the tip or end portion of the shank 144 (e.g., with breakable connection points). Regardless of relative position of the expandable plug 146 and the shank 144 in the newly formed or uncompressed state, the expandable plug 146 may considered a component of the rivet 140 and/or a component of the base end 128. The rivet 140 may be formed to have a length such that at least a portion of upper surface of the head 142 is exposed inside the spacer 120 by the notch 130 in the newly formed or uncompressed state. The head 142 may be slightly undersized relative to the notch 130 and/or hollow cavity of the spacer 120 exposed by the notch 130 so that the rivet 140 remains appropriately aligned with the base opening 228 with limited horizontal movement prior to being pressed through the base opening 228 and into the expandable plug 146.

Figure 3:
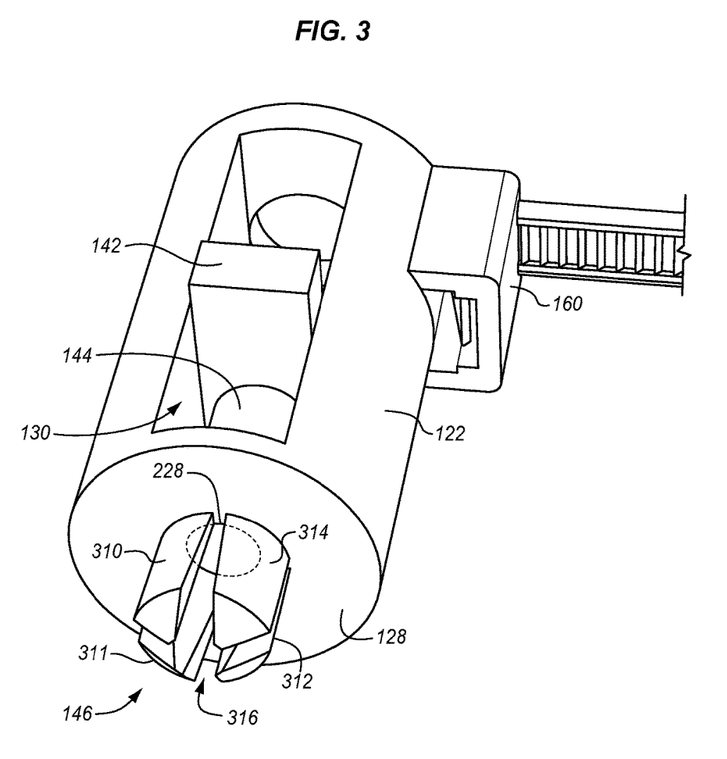
FIG. 3 is another perspective view of a cable tie mount in another exemplary embodiment.

FIG. 3 is another perspective view of the cable tie mount 110 in another exemplary embodiment. As shown in FIG. 3, the expandable plug 146 may include legs 310-313 which are separated from one another via one or more slits. At least one slit 316 at or near a center of the legs 310-313 is slightly undersized relative to the diameter or width of the shank 144. The slit 316 is generally aligned with the base opening 228 and the shank 144. As the shank 144 slides through the base opening 228 and into the slit 316, the contact of the shank 144 causes the legs 310-313 to plastically deform and expand, thereby strengthening the frictional force between the expandable plug 146 and the hole 214 and stabilizing the cable tie mount 110 with the substrate 210 (e.g., according to vibration and load requirements for the cables 252-256 in an aircraft). If or when removal of the cable tie mount 110 from the substrate 210 is desired, a reverse or upward force applied to the rivet 140 retracts the shank 144 back into the spacer 120 leaving a void that allows the legs 310-313 to collapse inwardly so that the expandable plug 146 may be easily removed from the hole 214.

Figure 4:
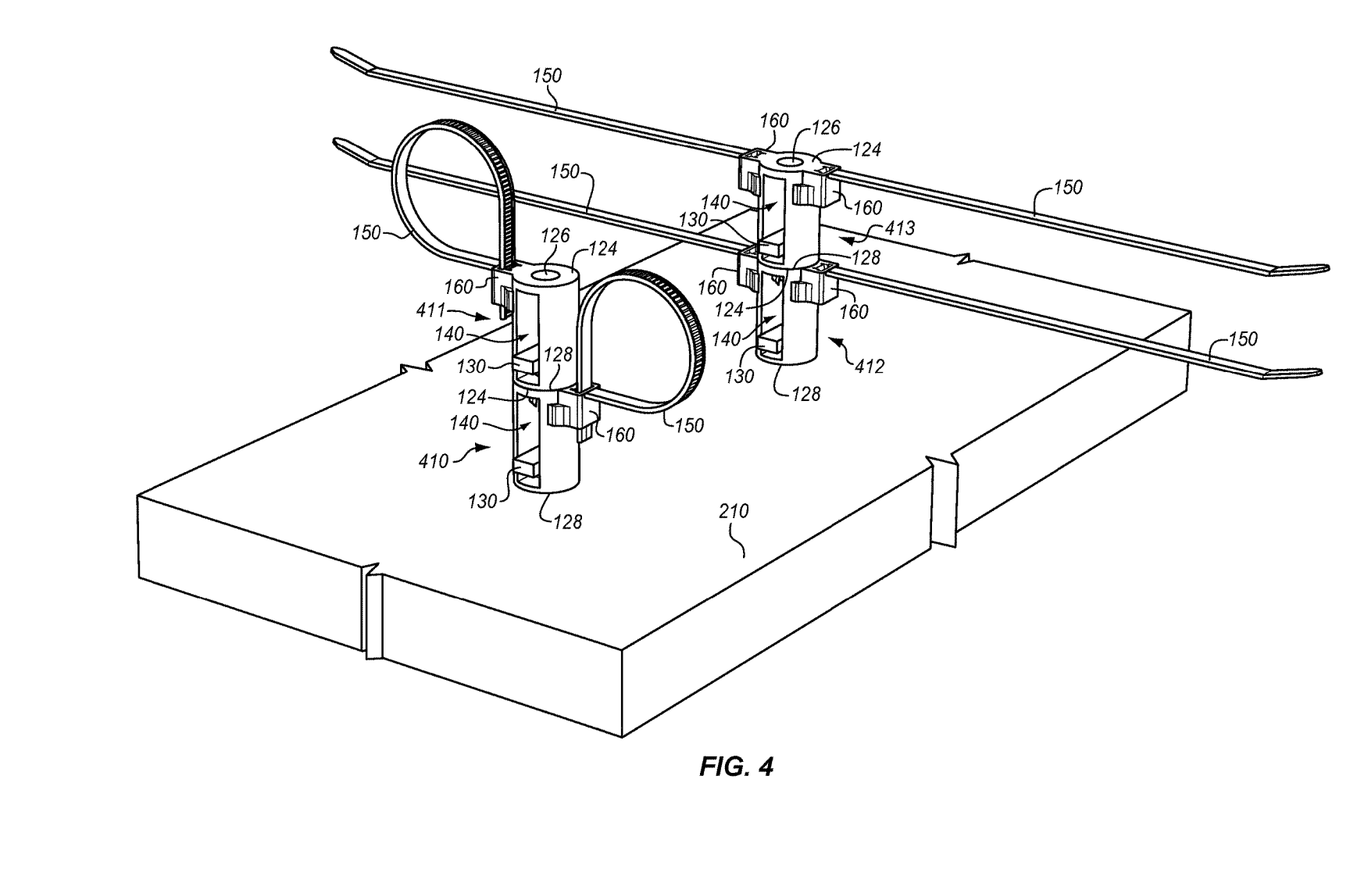
FIG. 4 is a perspective view of stacked cable tie mounts in an exemplary embodiment.

FIG. 4 is a perspective view of cable tie mounts 401-403 in a stacked configuration in an exemplary embodiment. The cable tie mounts 401-403 are each similar to the cable tie mount 110 previously described and thus description of common elements and features may be omitted for sake of brevity. In this example, a first cable tie mount 401 secures to the substrate 210 and is capable of bundling one or more cables to its side similar to that already described in FIGS. 2-3. As such, a second cable tie mount 402 may be stacked on top of the first cable tie mount 401 such that the surface of the base end 128 of the second cable tie mount 402 is substantially flush with or flat against the surface of the top end 124 of the first cable tie mount 401. The expandable plug 146 of the second cable tie mount 402 is undersized relative to the top opening 126 in the surface of the top end 124 of the first cable tie mount 401, and therefore may be aligned, fitted, and firmly secured to the top opening 126 of the first cable tie mount 401 in a similar manner to that already described with respect to the hole 214 of the substrate 210. A third cable tie mount 403 and a fourth cable tie mount 404 are similarly stacked with one another.

The cable tie mounts 401-403 may be stacked in various combinations to achieve any desired vertical and/or horizontal spacing between different bundles of cables and/or the substrate 210. For instance, the first cable tie mount 401 and the second cable tie mount 401 are each configured with a single fastening device (i.e., the strap 150 and the locking head 160) formed on opposite sides of their respective spacers 120 to space two different bundles at a fixed horizontal and vertical distance when appropriately aligned and stacked. Alternatively, cable tie mounts 401-403 in a stacked configuration may have identically formed fastening devices and/or the spacers 120 may be rotated with respect to one another (e.g., while fitted but not secured by rivet 140) to the desired alignment and horizontal spacing.

The illustrated example additionally shows the third cable tie mount 403 and the fourth cable tie mount 404 each configured with two fastening devices on either side of their respective spacers 120. Thus, one or more cable tie mounts 401-403 in a stacked configuration may each individually secure multiple different bundles of cables in parallel fashion. To avoid interference with another stacked cable tie mount, the length of the strap 150 may be selected such that when it forms a closed loop with the locking head 160 it does not interfere or overlap vertically with the closed loop of a vertically stacked, adjacent cable tie mount. Numerous different stacking configurations of the cable tie mounts 401-403 are possible, including arrangements with three or more cable tie mounts 401-403, arrangements with differently sized cable tie mounts 401-403 or components with respect to another, and/or different bundling formations from one another, etc.

Figure 5A:
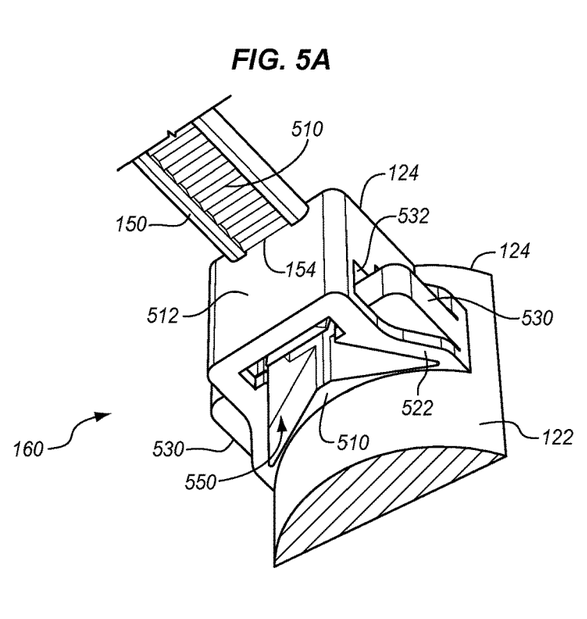
FIG. 5A is a perspective view of a locking head in an exemplary embodiment.

FIG. 5A is a perspective view of the locking head 160 in an exemplary embodiment. The locking head 160 is generally rectangular in shape and comprises a bottom wall 522, a top wall 524, a front wall 526, a rear wall 528, and side walls 530. Together, the walls define a channel 550 sized to receive the strap 150. The channel 550 is a passage for the strap 150 that extends longitudinally through the locking head 160 from an entrance in the top wall 524 to an exit in the bottom wall 522. The rear wall 528 forms to the curvature or shape of the elongated body 122. The attached end 154 of the strap 150 forms to the front wall 526 at or near a horizontal plane to align with top wall 524 and/or the top end 124 of the spacer 120. For instance, the top end 124 of the spacer 120, the top wall 524 of the locking head 160, and an inner side of the strap 150 near the attached end 154 may form a continuous, substantially flat surface. The strap 150 may include a plurality of teeth 510 formed along the length of an outer side of the strap 150 that engage and ratchet with internal locking components of the locking head 160.

Figure 5B:
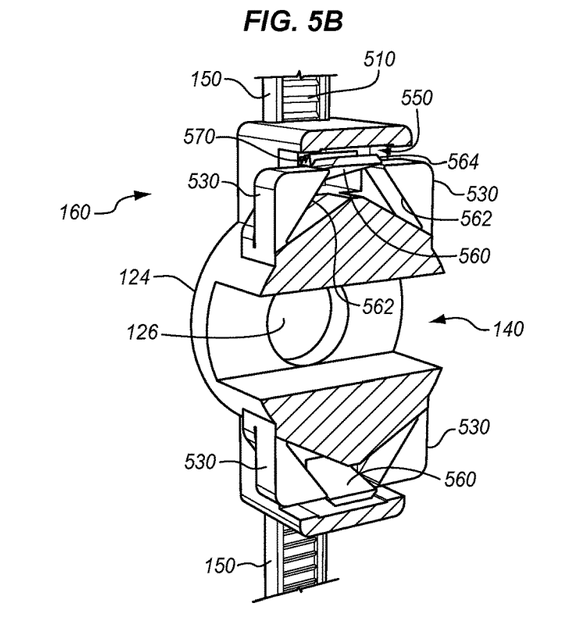
FIG. 5B is a perspective cross-sectional view of an upper portion of a cable tie mount with integrated locking heads on either side of the body.

FIG. 5B is a perspective cross-sectional view of an upper portion of the cable tie mount 110 with integrated locking heads 160 on either side of the elongated body 122. As illustrated in this example, each locking head 160 includes a pawl 560 with serrations 570 formed on a side thereto which engage with complementary serrations or teeth 510 formed on the adjacent side of the strap 150 when the strap 150 is looped around the items to be secured and then inserted through the locking head 160. When the strap 150 and the locking head 160 are engaged in this manner, the strap 150 may be further tightened as desired but is prevented from being pulled back out of the locking head 160 in the upward direction.

The locking head 160 may also include a release mechanism. To this end, the locking head 160 may include tie release levers 532 which protrude partially from the side walls 530 via cutouts 534 in the side walls 530. By squeezing the tie release levers 532 together, the pawl 560 inside the locking head 160 is pulled away from engagement with the strap 150. More particularly, the tie release levers 532 have angled surfaces 562 that abut an angled edge 564 of the pawl 560 such that when a squeezing force is applied to the tie release levers 532 the levered position of the pawl 560 is pushed back toward the elongated body 122 thus widening the channel 550 in the locking head 160 and allowing the teeth 510 of the strap 150 to disengage from the serrations 570 so that the strap 150 may be release and back out of the locking head 160 in the upward direction. This release mechanism thus enables the strap 150 to be withdrawn from the locking head 160 to free the secured items.

Figure 6A:
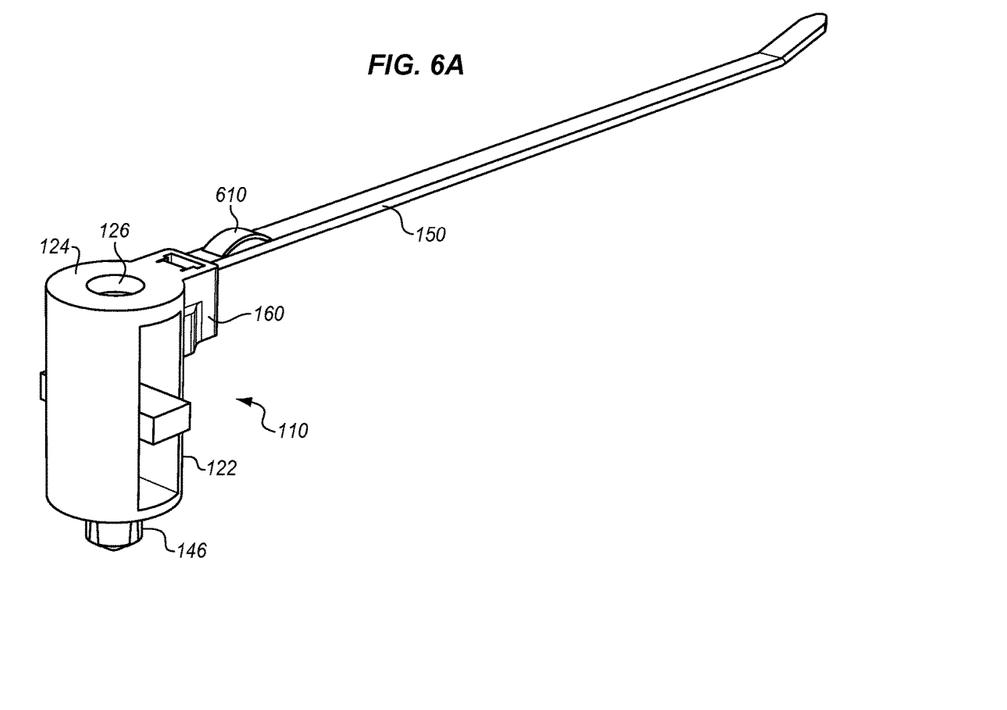
FIG. 6A is a perspective view of the cable tie mount with a compressor formed on the strap in an exemplary embodiment.
Figure 6B:
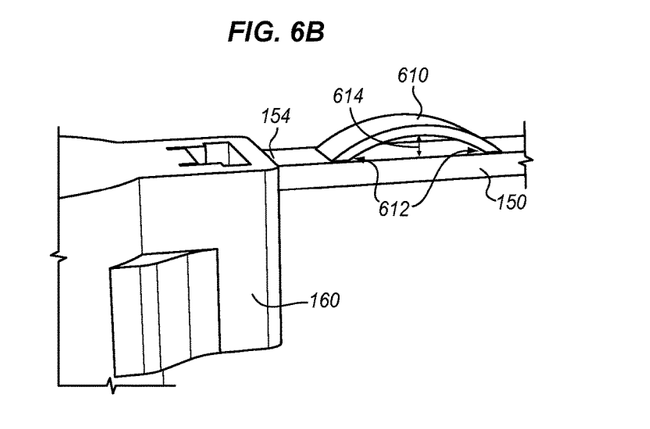
FIG. 6B is a perspective view of the locking head and the base end of the strap which includes the compressor in an exemplary embodiment.

FIG. 6A is a perspective view of the cable tie mount 110 with a compressor 610 formed on the strap 150 in an exemplary embodiment. FIG. 6B is a perspective view of the locking head 160 and the attached end 154 of the strap 150 which includes the compressor 610 in an exemplary embodiment. As shown in FIGS. 6A-6B, the cable tie mount 110 may include a compressor 610 integrally formed with any suitable plastic material. The compressor 610 is an arched member with connected ends 612 joined to an inner side of the strap 150 at a location on or near the attached end 154 of the strap 150. Between the joined ends 612, the compressor 610 curves a distance above the inner side of the strap 150 with a maximum arch distance 614 near a center of the joined ends 612. As the strap 150 flexes to form a closed loop with the locking head 160 and tightens around secured items, maximum arch distance 614 increases. Thus, the compressor 610 allows for smaller diameter cables or wires to be compressed and firmly secured without being over compressed by the inner side of the strap 150.

Although specific embodiments were described herein, the scope is not limited to those specific embodiments. Rather, the scope is defined by the following claims and any equivalents thereof.

What is claimed is:

1. An apparatus comprising:
   a cable tie mount comprising:
      a spacer having an elongated body with a base end, a top end distal from the base end, a hollow cavity between the base end and the top end, and a notch in a side of the elongated body that exposes the hollow cavity of the spacer;
      a cable fastener integrally formed with the spacer on a side of the elongated body;
      an expandable plug on the base end of the spacer; and
      a rivet in the hollow cavity of the spacer, the rivet including a head and a shank;
   wherein the notch exposes the head of the rivet in the hollow cavity; and
   wherein the shank of the rivet aligns with the expandable plug.

2. The apparatus of claim 1 wherein:
   the rivet is integrated with the spacer.

3. The apparatus of claim 1 wherein:
   the expandable plug includes a plurality of legs with a slit centered about the legs, the legs configured to expand radially away from one another when the shank is pressed through the base end and into the slit via a force applied to the head of the rivet.

4. The apparatus of claim 1 wherein:
   a portion of the head protrudes from the notch to be exposed outside the spacer.

5. The apparatus of claim 1 wherein:
   the top end of the spacer includes a top opening that is sized to receive another expandable plug of another cable tie mount.

6. The apparatus of claim 1 wherein:
   the elongated body of the spacer is a cylindrical body.

7. The apparatus of claim 1 wherein:
   the cable fastener includes:
      a strap including teeth along a side of the strap; and
      a locking head including a pawl to engage one or more of the teeth when a free end of the strap is inserted through a passage in the locking head to form a closed loop.

8. The apparatus of claim 7 wherein:

the locking head further includes angled levers protruding from either side of the locking head and that abut an angled edge of the pawl inside the locking head; and a squeezing force applied to the angled levers causes the pawl to move and widen the passage in the locking head to disengage the teeth from the pawl and release the strap from the locking head.

9. An apparatus comprising:

a cable tie mount comprising:

a spacer having an elongated body with a base end, a top end distal from the base end, a hollow cavity between the base end and the top end, and a notch in a side of the elongated body that exposes the hollow cavity of the spacer;

a cable fastener formed on the elongated body; and a rivet including a head, a shank, and an expandable plug distal from the head;

wherein the base end includes a base opening that is smaller than the hollow cavity;

wherein the head is positioned in the hollow cavity and is larger than the base opening;

wherein the shank is sized to fit through the base opening and into the expandable plug to cause the expandable plug to expand;

wherein the expandable plug is formed on the base end to project away from the spacer; and wherein the notch exposes the head through the side of the elongated body.

10. The apparatus of claim 9 wherein:

the top end of the spacer includes a top opening that is sized to receive another expandable plug of another cable tie mount.

11. The apparatus of claim 9 wherein:

the expandable plug includes a plurality of legs and a slit centered about the legs; and the legs expand radially away from one another when the shank is pressed to slide through the base opening and into the slit via a force applied to the head of the rivet.

12. The apparatus of claim 9 wherein:

the elongated body of the spacer is a cylindrical body; and the cable fastener includes a locking head and a strap formed together on a side of the cylindrical body at a location that is adjacent to the top end of the spacer.

13. The apparatus of claim 9 further comprising:

a strap that includes teeth along a side of the strap; and a locking head that includes a pawl to engage one or more of the teeth when a free end of the strap is inserted through a passage in the locking head.

14. An apparatus comprising:

a first cable tie mount; and a second cable tie mount;

each of the first cable tie mount and the second cable tie mount comprising:

a spacer having an elongated body with a base end, a top end distal from the base end, a hollow cavity between the base end and the top end, and a notch in a side of the elongated body that exposes the hollow cavity of the spacer;

a cable fastener formed on the elongated body; and a rivet integrated with the spacer and including a head, a shank, and an expandable plug distal from the head;

wherein the top end includes a top opening that is smaller than the hollow cavity;

wherein the base end includes a base opening that is smaller than the hollow cavity;

wherein the head is positioned in the hollow cavity of the spacer and is larger than the base opening;

wherein the shank extends through the base opening and is slidable within the base opening;

wherein the expandable plug projects from the base end of the spacer; and wherein the expandable plug of the second cable tie mount fits into the top opening of the first cable tie mount to stack the second cable tie mount on top of the first cable tie mount.

15. The apparatus of claim 14 wherein:

wherein the notch in the side of the first cable tie mount exposes the rivet of the first cable tie mount while the second cable tie mount is stacked on top of the first cable tie mount.

16. The apparatus of claim 14 wherein:

the cable fastener includes a locking head and a strap formed together on the side of the elongated body at a location that is adjacent to the top end of the spacer.

17. The apparatus of claim 16 wherein:

the strap includes a joined end that attaches to the locking head, and a free end to removably engage with the locking head when the free end of the strap is inserted through a passage in the locking head.

18. The apparatus of claim 17 wherein:

the joined end of the strap projects away from the spacer in a direction parallel with a flat surface of the top end; and when the free end of the strap is engaged with the locking head, the strap forms a closed loop away from the spacer of the first cable tie mount to allow the second cable tie mount to be stacked on top of the first cable tie mount while the closed loop is formed.

19. The apparatus of claim 14 wherein:

the expandable plug includes a plurality of legs comprising plastically deformable material, and a slit centered about the legs; and the legs of the second cable tie mount expand away from one another via the shank to grip the top opening of the first cable tie mount.

20. The apparatus of claim 14 wherein:

the elongated body of the spacer is a cylindrical body.

* * * * *